Sept. 24, 1940.   L. PACHNER   2,215,618
FISHING ROD HOLDER
Filed Jan. 23, 1940
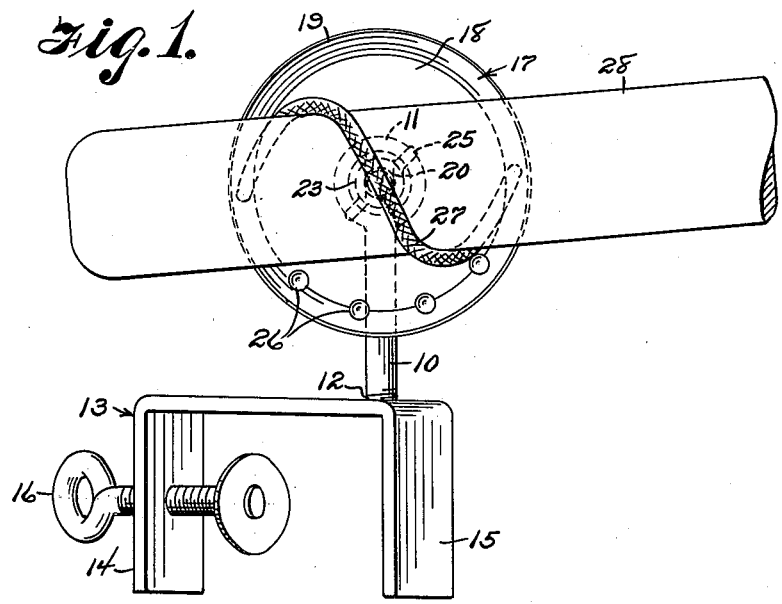
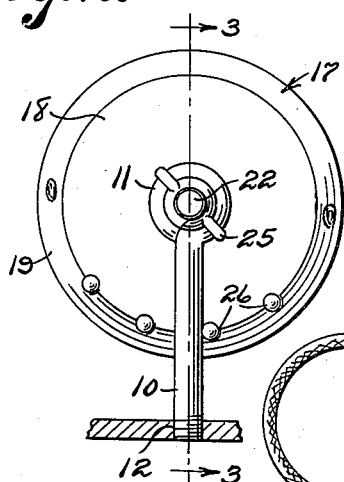
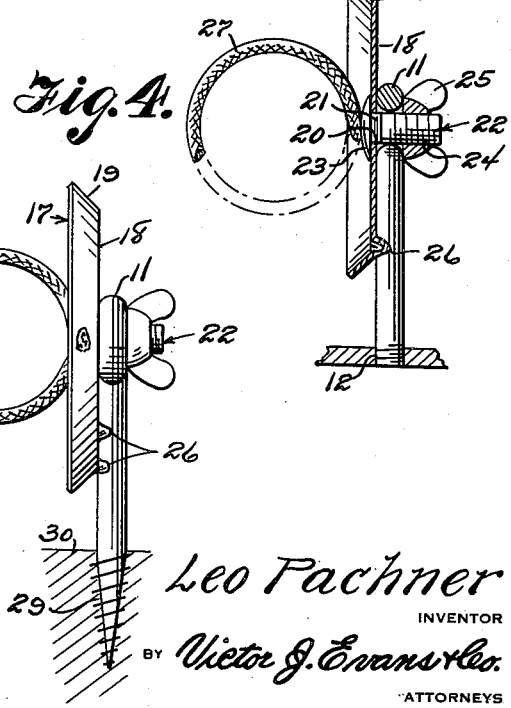
Leo Pachner
INVENTOR
BY Victor J. Evans & Co.
ATTORNEYS Patented Sept. 24, 1940

2,215,618

UNITED STATES PATENT OFFICE 2,215,618

FISHING ROD HOLDER

Leo Pachner, Chicago, Ill., assignor to Pachner & Koller, Incorporated, Chicago, Ill.

Application January 23, 1940, Serial No. 315,238

4 Claims. (Cl. 248—38)

My invention relates to holders for fishing rods.

An important object of my invention is to provide a holder for fishing rods that may be easily and expeditiously attached to the gunwale or seat mounting of a boat, or other supporting object.

Another object of my invention is to provide a holder of the above-mentioned character that will readily accommodate varying sizes of fishing rods.

Still another object of my invention is to provide a holder for a fishing rod that is adjustable in its nature to hold the rod in a predetermined angular position relative to the boat, thereby relieving the fisherman of the necessity of constantly supervising the same.

Yet another object of my invention is the provision of a holder for a fishing rod that is simple in construction, efficent and efficacious in the performance of its duties and inexpensive to manufacture.

Other objects and advantages of my invention will be apparent during the course of the following description.

In the drawing, forming a part of this specification, and in which like numerals are employed to designate like parts throughout the same, Figure 1 is a front elevation of a device embodying my invention, illustrating a fragmentary portion of a fishing rod associated therewith, Figure 2 is a rear elevation of the same, showing parts in section and parts in elevation, Figure 3 is a vertical sectional view, taken on the line 3—3 of Figure 2, and Figure 4 is a side elevation of a modified form of my invention.

In the accompanying drawing, wherein for the purpose of illustration is shown a preferred embodiment of my invention, the numeral 10 designates a supporting rod, having a looped upper end 11 and with the lower extremity 12 threadedly engaging the closed end of the U-shaped bracket 13. The depending arms 14 and 15 of the bracket 13 are adapted to embracingly engage the gunwale of a boat, or any other suitable supporting object, and the arm 14 carries a threaded clamping screw 16 adapted to be manually rotated into appressed relation with the side of the supporting object.

The disk 17 comprises a flat bottom portion 18 formed with a flared peripheral skirt 19. The bottom portion 18 of the disk is provided with a substantially square axial opening 20 which receives the substantially square shoulder portion 21 of the threaded bolt 22. The head 23 of the bolt engages the inner face of the bottom portion 18 and the shank 24 thereof extends through the looped end 11 of the supporting rod 10 to threadedly receive the wing nut 25. The disk 17 is formed with a plurality of spaced peripheral protuberances 26 which project from the plain surface thereof in a direction away from the skirt 19 to engage the supporting rod 10 when the wing nut 25 is threaded into appressed relation therewith in a manner to prevent rotation of the disk relative to the said supporting rod. The cable 27 has its ends fastened to the disk 17 at diametrically opposed sides thereof and is adapted to be disposed eccentrically about the butt end of a fishing rod 28.

If found desirable the clamp 13 may be eliminated and the lower end of the supporting rod 10 formed with a threaded point 29 which may be imbedded in a supporting object 30. It may be seen that the skirt 19 of the disk will hold the fishing rod spaced outwardly from the head of the bolt 22 and that the cable 27 will be looped therearound. as illustrated in Figure 1, to securely hold the rod against displacement. The manner in which the cable 27 is associated with the fishing rod will permit the same to accommodate varying sizes of rods with equal facility and will efficiently hold the rod at the desired angular position relative to the supporting object. The square shoulder portion 21 of the bolt 22 will prevent rotation of the disk relative to the bolt, and the protuberances 26 will prevent rotation of the disk relative to the supporting rod 10. By threading the wing nut 25 out of engagement with the supporting rod, the disk 17 may be rotated about its axis to move any one of the protuberances 26 into engagement with the rod 10 to hold the fishing rod 28 at a preselected angular position, and when the nut is threaded into engagement with the supporting rod it will hold the fishing rod fixedly in place.

It is to be understood that the form of my invention herewith shown and described, is to be taken as a preferred example of the same, and that various changes in the size, shape and arrangement of parts may be resorted to without departing from the spirit of my invention, or the scope of the appended claims.

Having thus described my invention, I claim:

1. A fishing rod holder comprising a support, a disk rotatably mounted on the support and having projecting lug elements adapted to engage the support to hold the disk in a predetermined position relative to the support, and a flexible cable element having its ends secured to the disk at spaced points thereon, said cable being adapted to be helically looped around a fishing rod to hold the same in association with the said disk.

2. A fishing rod holder comprising a support, a disk mounted on the support for rotation about its axis, means cooperative with the disk and the support to hold the said disk against rotation and in a predetermined position relative to the support, and a flexible cable element having its ends secured to the disk at diametrically opposed sides thereof, said cable being adapted to be helically looped around a fishing rod to hold the same in association with the said disk.

3. A fishing rod holder comprising a supporting arm, a disk having a substantially square axial opening and a plurality of peripheral protuberances, a threaded bolt connecting the disk to the supporting arm, said bolt having a substantially square shoulder portion adapted to be received within the axial opening of the disk to hold the disk against rotation relative thereto, a nut carried by the said bolt and adapted to engage the supporting arm to hold the peripheral protuberances of the disk in engagement with supporting arm and to prevent rotation of the disk relative to the said supporting arm, and a flexible cable having its ends spaced apart and connected to the disk, said cable being adapted to be helically looped around the fishing rod to hold the same in association with the said disk.

4. A fishing rod holder comprising a supporting arm, means for detachably clamping said arm to a supporting object, a disk having a substantially square axial opening and a plurality of peripheral protuberances, a threaded bolt connecting the disk to the supporting arm, said bolt having a substantially square shoulder portion adapted to be received within the axial opening of the disk to hold the disk against rotation relative thereto, a nut carried by the said bolt and adapted to engage the supporting arm to hold the peripheral protuberances of the disk in engagement with supporting arm in a manner to hold the disk in a selected position relative to the arm and to prevent rotation of the disk relative thereto, and means carried by the disk to fixedly support a fishing rod in association with the said disk.

LEO PACHNER.